(12) United States Patent
Hirata et al.

(10) Patent No.: US 12,686,113 B2
(45) Date of Patent: Jul. 21, 2026

(54) BENDING STRUCTURE BODY

(71) Applicant: NHK SPRING CO., LTD., Kanagawa (JP)

(72) Inventors: Takafumi Hirata, Kanagawa (JP); Yuki Hotoda, Kanagawa (JP); Masahiro Inaba, Kanagawa (JP); Yuki Hayakawa, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 18/287,020

(22) PCT Filed: Apr. 28, 2022

(86) PCT No.: PCT/JP2022/019274
§ 371 (c)(1),
(2) Date: Oct. 16, 2023

(87) PCT Pub. No.: WO2022/230975
PCT Pub. Date: Nov. 3, 2022

(65) Prior Publication Data
US 2024/0189981 A1      Jun. 13, 2024

(30) Foreign Application Priority Data
Apr. 30, 2021     (JP) ................................. 2021-078047

(51) Int. Cl.
*B25J 9/00*                (2006.01)
(52) U.S. Cl.
CPC .................................. *B25J 9/0015* (2013.01)
(58) Field of Classification Search
CPC ..... B25J 18/06; B25J 9/06; B25J 9/104; B25J 3/02; A61B 2034/301; A61B 2034/305;
(Continued)

(56) References Cited

U.S. PATENT DOCUMENTS 3,266,059 A      8/1966  Stelle
5,181,600 A  *  1/1993  Chappell ................ B65G 21/14
                                                                198/309
(Continued)

FOREIGN PATENT DOCUMENTS

JP        2008237810        10/2008
JP        2014090800         5/2014
(Continued)

OTHER PUBLICATIONS

English Translation of WO-2020036085-A1 (Year: 2020).*
(Continued)

*Primary Examiner* — Victor L Macarthur
(74) *Attorney, Agent, or Firm* — JCIPRNET

(57)                          ABSTRACT

Provided is a multi-joint bending structure body that makes it possible to obtain a structure capable of making a small-radius turn. The present invention comprises: a plurality of first bendable parts 9 and second bendable parts 11 that can elastically bend with respect to the axial direction; and an intermediate part 13 that is positioned between a first bendable part 9 and a second bendable part 11 which are adjacent to each other. The first bendable parts 9 and the second bendable parts 11 are provided with a flexible member 17 that is an integral body in the axial direction. The intermediate part 13 is attached to the flexible member 17 between the first bendable part 9 and the second bendable part 11 which are adjacent, and suppresses the bending of the flexible member 17 with respect to the axial direction.

10 Claims, 4 Drawing Sheets

(58) Field of Classification Search

CPC ..... A61B 1/0057; A61B 1/0055; A61B 34/30; A61B 2017/00323; A61B 2017/00305; A61B 2017/2905; A61M 25/0138; A61M 25/0147

See application file for complete search history.

(56) References Cited

U.S. PATENT DOCUMENTS

| | | | | | |
|---|---|---|---|---|---|
| 5,219,259 | A | * | 6/1993 | Cochran | B64D 9/00 |
| | | | | | 414/535 |
| 5,269,641 | A | * | 12/1993 | Cochran | B64D 9/00 |
| | | | | | 414/345 |
| 5,271,250 | A | * | 12/1993 | Benito | D04B 15/90 |
| | | | | | 66/152 |
| 5,685,215 | A | * | 11/1997 | Jepsen | F03C 1/053 |
| | | | | | 91/499 |
| 5,782,342 | A | * | 7/1998 | Hewitt | H01H 23/141 |
| | | | | | 200/330 |

| | | | | | |
|---|---|---|---|---|---|
| 5,995,345 | A | * | 11/1999 | Overbo | G11B 25/066 |
| | | | | | 720/720 |
| 6,004,151 | A | * | 12/1999 | Hashiguchi | H01R 12/89 |
| | | | | | 439/260 |
| 9,814,480 | B2 | * | 11/2017 | Tadano | A61B 34/71 |

FOREIGN PATENT DOCUMENTS

| | | | | |
|---|---|---|---|---|
| JP | 2020026019 | | 2/2020 | |
| WO | WO-2020036085 A1 | * | 2/2020 | ............ A61B 17/29 |

OTHER PUBLICATIONS

"Written Opinion of the International Searching Authority (Form PCT/ISA/237) of PCT/JP2022/019274," mailed on Jul. 19, 2022, with English translation thereof, pp. 1-6.

"International Search Report (Form PCT/ISA/210) of PCT/JP2022/019274", mailed on Jul. 19, 2022, with English translation thereof, pp. 1-4.

"Search Report of Europe Counterpart Application", issued on Sep. 16, 2024, p. 1-p. 8.

* cited by examiner

BENDING STRUCTURE BODY

CROSS-REFERENCE TO RELATED APPLICATION

This application is a 371 application of the International PCT application serial no. PCT/JP2022/019274, filed on Apr. 28, 2022, which claims the priority benefits of Japan Patent Application No. 2021-078047, filed on Apr. 30, 2021. The entirety of each of the above-mentioned patent applications is hereby incorporated by reference herein and made a part of this specification.

TECHNICAL FIELD

The present invention relates to a bending structure body provided for joint function parts of robots, manipulators, and the like.

RELATED ART

A multi-joint structure as disclosed in Patent Literature 1, for example, is known as a conventional bending structure body.

In this bending structure body, a plurality of bending pieces are rotatably connected to each other by a rotating shaft part. Adjacent bending pieces rotate in directions perpendicular to each other, which enables the bending structure body as a whole to bend with a high degree of freedom.

However, in such a bending structure body, the space between the bending pieces that bend in the same direction becomes long due to the interposition of the bending pieces that do not contribute to the bending, resulting in a structure that does not allow a small-radius turn.

CITATION LIST

Patent Literature

[Patent Literature 1] Japanese Patent Application Laid-Open No. 2008-237810

SUMMARY OF INVENTION

Technical Problem

The problem to be solved is that the multi-joint bending structure body does not allow a small-radius turn.

Solution to Problem

The present invention provides a bending structure body, which includes: a plurality of bendable parts that are elastically bendable with respect to an axial direction; and an intermediate part positioned between adjacent bendable parts. The plurality of bendable parts include a flexible member that is integral in the axial direction, and the intermediate part is attached to the flexible member between the adjacent bendable parts and suppresses bending of the flexible member with respect to the axial direction.

Effects of Invention

The present invention achieves a structure that can reduce the axial dimension of the intermediate part as long as bending of the flexible member can be suppressed between adjacent bendable parts, which as a result makes it possible to reduce the size of the portion that does not contribute to bending and allow a small-radius turn.

DESCRIPTION OF EMBODIMENTS

Figure 1:
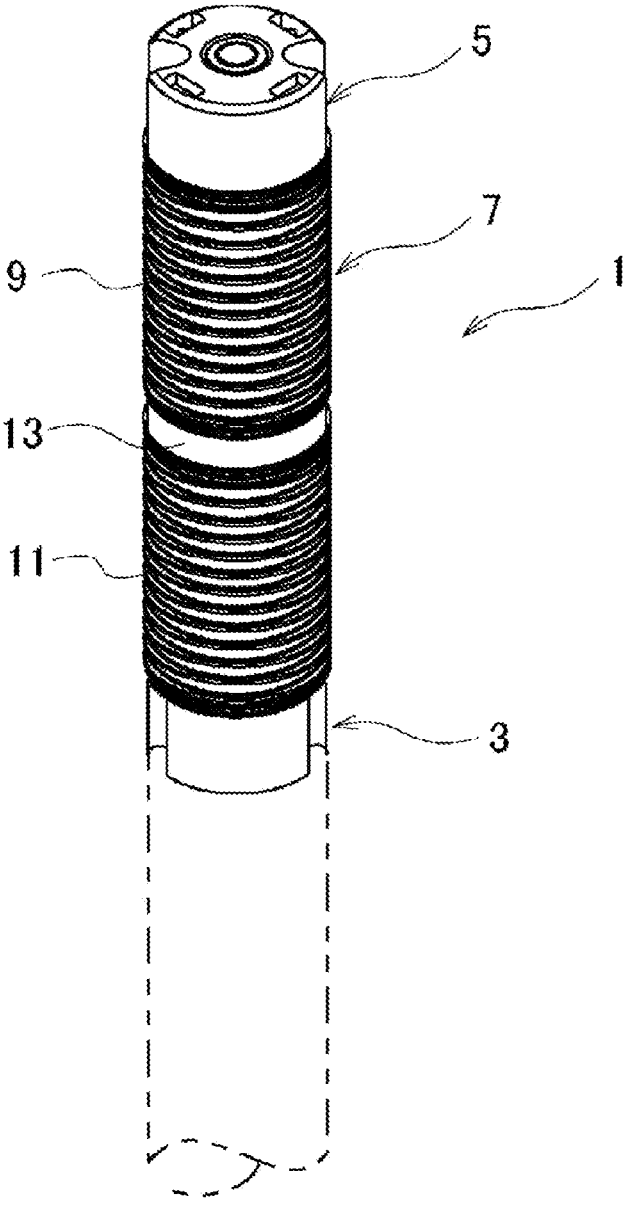
FIG. 1 is a perspective view showing the bending structure body according to Example 1 of the present invention.

In order to obtain a structure that allows a small-radius turn, a multi-joint bending structure body is achieved by attaching an intermediate part that suppresses bending between adjacent bendable parts to an integral flexible member across multiple bendable parts.

That is, the bending structure body (1) includes a plurality of bendable parts (9, 11) and an intermediate part (13). The bendable parts (9, 11) are elastically bendable with respect to the axial direction. These bendable parts (9, 11) include an integral flexible member (17) in the axial direction. The intermediate part (13) is positioned between adjacent bendable parts (9, 11), and is attached to the flexible member (17) between these bendable parts (9, 11) and suppresses bending of the flexible member (17) with respect to the axial direction.

The intermediate part (13) can have various forms, and may be an annular member for inserting the flexible member (17) in the axial direction. In this case, the intermediate part (13) is attached to the flexible member (17) at the inner circumference.

The plurality of bendable parts (9, 11) may each include an outer member (19, 21) that surrounds the flexible member (17) and has elasticity.

In this case, the outer members (19, 21) of the adjacent bendable parts (9, 11) may have ends that face each other across the intermediate part (13) in the axial direction, and the ends may be respectively attached to both sides of the intermediate part (13) in the axial direction.

The flexible member (17) can have various forms, but may include an inner coil part (27) and an outer coil part (29). In this case, the corresponding winding parts (27a) of the inner coil part (27) are fitted into the gaps (29b) between adjacent winding parts (29a) of the outer coil part (29).

Example 1

[Bending Structure Body]

Figure 2:
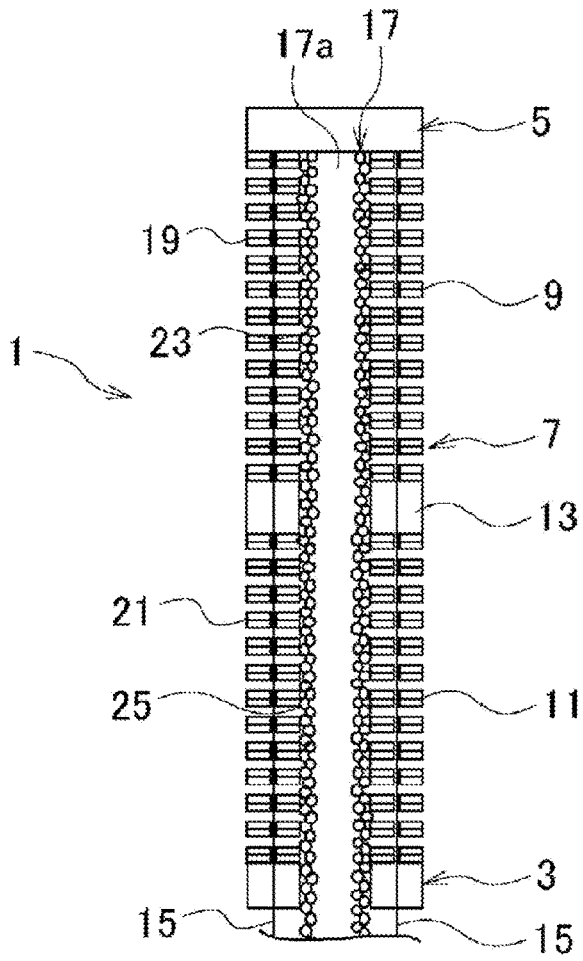
FIG. 2 is a schematic longitudinal cross-sectional view of the bending structure body of FIG. 1 when the bending structure body is not bent.
Figure 3:
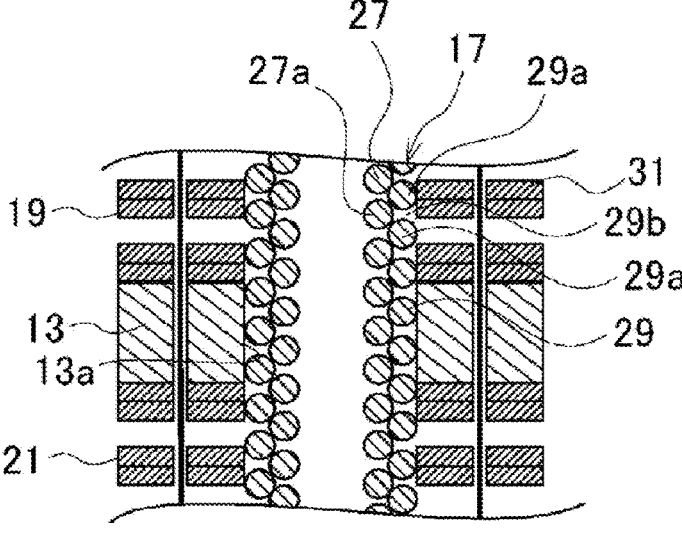
FIG. 3 is an enlarged view showing main parts of FIG. 2.

FIG. 1 is a front view showing the bending structure body according to Example 1 of the present invention. FIG. 2 is a schematic longitudinal cross-sectional view of the bending structure body of FIG. 1 when the bending structure body is not bent. FIG. 3 is an enlarged view of main parts of FIG.

Figure 4:
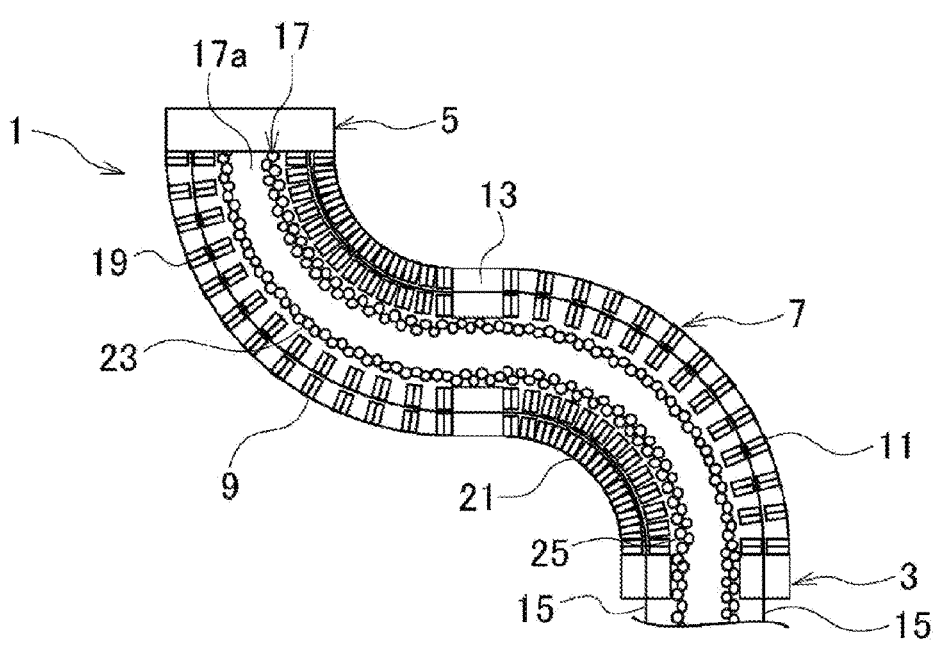
FIG. 4 is a longitudinal cross-sectional view of the bending structure body of FIG. 1 when the bending structure body is bent.

2. FIG. 4 is a schematic longitudinal cross-sectional view of the bending structure body of FIG. 1 when the bending structure body is bent.

The bending structure body 1 is applied to the joint function parts of various devices such as manipulators, robots, and actuators for medical and industrial purposes. The joint function parts are apparatuses, mechanisms, devices, etc. which function as joints that bend and extend.

The bending structure body 1 of this embodiment has a multi-joint structure, and includes a base portion 3, a movable portion 5, and a multi-joint portion 7.

The base portion 3 is a columnar body, for example, a circular columnar body made of metal, resin, or the like. This base portion 3 is attached to an end of a shaft of a manipulator or the like. The base portion 3 is not limited to a columnar body, and may have an appropriate form according to the device to which the bending structure body 1 is applied.

Like the base portion 3, the movable portion 5 is a columnar body, for example, a circular columnar body. An end effector or the like corresponding to the device to which the bending structure body 1 is applied is attached to the movable portion 5. The movable portion 5 also has an appropriate form according to the device to which the bending structure body 1 is applied, and is not limited to a columnar body.

The movable portion 5 is supported by the base portion 3 to be displaceable with respect to the axial direction by the multi-joint portion 7.

[Multi-Joint Portion]

The multi-joint portion 7 includes a first bendable part 9, a second bendable part 11, and an intermediate part 13.

The first bendable part 9 and the second bendable part 11 are parts that can bend and extend as joints, respectively. Although the first bendable part 9 and the second bendable part 11 have an elastic force that enables the first bendable part 9 and the second bendable part 11 to bend and extend elastically, the first bendable part 9 and the second bendable part 11 function even without an elastic force. In this embodiment, the bending structure body 1 has two adjacent bendable parts 9 and 11, but may have three or more bendable parts.

The bending and extension refer to bending and extension in a direction along the axis of the bending structure body 1 (hereinafter referred to as axial direction). The axial direction needs not be strictly along the axis of the bending structure body 1.

The first bendable part 9 is a bendable part on one side of the intermediate part 13 in the axial direction, for example, on the side of the movable portion 5, and the second bendable part 11 is a bendable part on the other side of the intermediate part 13 in the axial direction, for example, on the side of the base portion 3. When there are three or more bendable parts, among the adjacent bendable parts, one side in the axial direction with respect to the intermediate part 13 is the first bendable part 9 and the other side in the axial direction is the second bendable part 11. The number of intermediate parts 13 is one less than the number of bendable parts 9 and 11.

The first bendable part 9 is operated to bend by a wire 15 connected to the movable portion 5. The wire 15 is inserted through the first bendable part 9, the intermediate part 13, and the second bendable part 11 to reach the side of the base portion 3, and is pulled on the side of the base portion 3 so as to make the first bendable part 9 bendable.

Like the first bendable part 9, the second bendable part 11 is operated to bend by a wire (not shown). The wire is attached to the intermediate part 13, is inserted through the second bendable part 11 to reach the side of the base portion 3, and is pulled on the side of the base portion 3 so as to make the second bendable part 11 bendable.

The first bendable part 9 and the second bendable part 11 may also be bent by an appropriate cord-like body such as a single wire, a stranded wire, a piano wire, an articulated rod, a chain, a string, a thread, and a rope, other than a wire.

The first bendable part 9 and the second bendable part 11 have the same length in the axial direction. However, the lengths of the first bendable part 9 and the second bendable part 11 in the axial direction may be different by changing the position of the intermediate part 13 in the axial direction (see FIG. 5).

The first bendable part 9 and the second bendable part 11 are composed of a flexible member 17 and outer members 19 and 21.

The flexible member 17 is arranged along the axial direction and functions as a core material that suppresses compression of the first bendable part 9 and the second bendable part 11 in the axial direction. The flexible member 17 is formed in a cylindrical shape as a whole and defines an insertion hole 17a inside. The insertion hole 17a is for inserting a flexible member such as a wire or an air tube. The flexible member 17 may have a configuration that does not define the insertion hole 17a depending on the device to which the bending structure body 1 is applied.

The flexible member 17 of this embodiment is configured integrally in the axial direction from the first bendable part 9 to the second bendable part 11. The flexible member 17 of this embodiment is continuous from the first bendable part 9 to the second bendable part 11 without interruption, and extends from the base portion 3 to the movable portion 5. This flexible member 17 is divided into a first portion 23 and a second portion 25 by attaching the intermediate part 13 as described later. The first portion 23 and the second portion 25 correspond to the first bendable part 9 and the second bendable part 11, respectively.

The flexible member 17 may be formed separately between the first bendable part 9 and the second bendable part 11, and the separated ends may be positioned within the range of the intermediate part 13 in the axial direction so that the flexible member 17 is configured substantially integrally.

In this embodiment, the flexible member 17 has a double coil structure and includes an inner coil part 27 and an outer coil part 29. The flexible member 17 can have various forms, and may be configured by a single contact coil spring, a flexible cylindrical body, or the like.

Each of the inner coil part 27 and the outer coil part 29 is made of metal, resin, or the like, and is a flexible coil spring capable of bending and extending with respect to the axial direction. The inner coil part 27 has a smaller center diameter than the outer coil part 29 and is screwed into the outer coil part 29. Accordingly, the corresponding winding part 27a of the inner coil part 27 is fitted into a gap 29b between the adjacent winding parts 29a of the outer coil part 29.

This double-coil-shaped flexible member 17 can bend and extend with respect to the axial direction as a whole, and the length of the axis is substantially constant before, after, and during bending.

That is, when the flexible member 17 is bent by an external force, the inner side of the bending contracts and the outer side of the bending expands so that the length of the axis does not change compared to the time when the flexible member 17 is not bent. Therefore, the path length for the member inserted through the insertion hole 17a can be made constant.

Further, as the corresponding winding part 27a of the inner coil part 27 is fitted into the gap 29b between the adjacent winding parts 29a of the outer coil part 29, the flexible member 17 has a configuration that suppresses compression in the axial direction.

The outer members 19 and 21 are elastic members provided on the first bendable part 9 and the second bendable part 11, respectively. These outer members 19 and 21 impart elasticity to the first bendable part 9 and the second bendable part 11 so that the first bendable part 9 and the second bendable part 11 can be restored (extended) after being bent. Therefore, the flexible member 17 can be set to have low elasticity and high flexibility. The outer members 19 and 21 may also be omitted. In this case, the flexible member 17 itself may have elasticity so that the flexible member 17 can be restored after being bent.

These outer members 19 and 21 have annular shapes surrounding the flexible member 17, and are attached between the movable portion 5 and the intermediate part 13 and between the intermediate part 13 and the base portion 3, respectively. This attachment positions the outer members 19 and 21 relative to the flexible member 17. Although the outer members 19 and 21 are positioned concentrically with the flexible member 17 in this embodiment, the outer members 19 and 21 may not be concentric with the flexible member 17.

The outer members 19 and 21 may be interposed between the movable portion 5 and the intermediate part 13 and between the intermediate part 13 and the base portion 3.

The outer members 19 and 21 of this embodiment are configured by laminating a plurality of wave washers 31 made of metal, resin, or the like in the axial direction. These outer members 19 and 21 are bendable by elastic deformation of the wave washers 31.

In addition, the outer members 19 and 21 are not necessarily configured by laminating the wave washers 31, and can be configured by other members. For example, the outer members 19 and 21 can be configured by a coil spring, a bellows made of a tube having a corrugated cross section, or a double coil similar to the flexible member 17.

The intermediate part 13 is attached to the flexible member 17 between the first bendable part 9 and the second bendable part 11 adjacent to each other to suppress bending of the flexible member 17 in the axial direction. In this embodiment, the suppression of bending means to prevent bending. However, the suppression of bending may be that the intermediate part 13 slightly allows bending of the flexible member 17 within a range that does not affect the operations of the first bendable part 9 and the second bendable part 11.

The intermediate part 13 of this embodiment is an annular member through which the flexible member 17 is inserted in the axial direction. The intermediate part 13, which is an annular member, is formed in a plate shape that has an insertion hole 13a for the flexible member 17 at the central portion.

However, the shape of the intermediate part 13 is arbitrary. In addition to a plate shape having the insertion hole 13a, the intermediate part 13 may have a cylindrical shape, or the intermediate part 13 may be formed by attaching members such as a plurality of separated plate-shaped bodies to the flexible member 17 in an annular shape, or may be an annular member having a notch in a part in the circumferential direction. Further, although the planar shape of the intermediate part 13 is circular in this embodiment, the planar shape may be formed into other geometrical shapes.

The intermediate part 13 is attached to the flexible member 17 at the inner circumference while the flexible member 17 is inserted therethrough. The attachment of the inner circumference of the intermediate part 13 to the flexible member 17 can be performed at a part or the entirety of the inner circumference of the intermediate part 13. The intermediate part 13 may be attached by welding, adhesion, crimping, or the like as appropriate. The position for attaching the intermediate part 13 is the central portion of the multi-joint portion 7 in the axial direction in this embodiment. However, the intermediate part 13 may be displaced in the axial direction with respect to the central portion to be attached.

Figure 5:
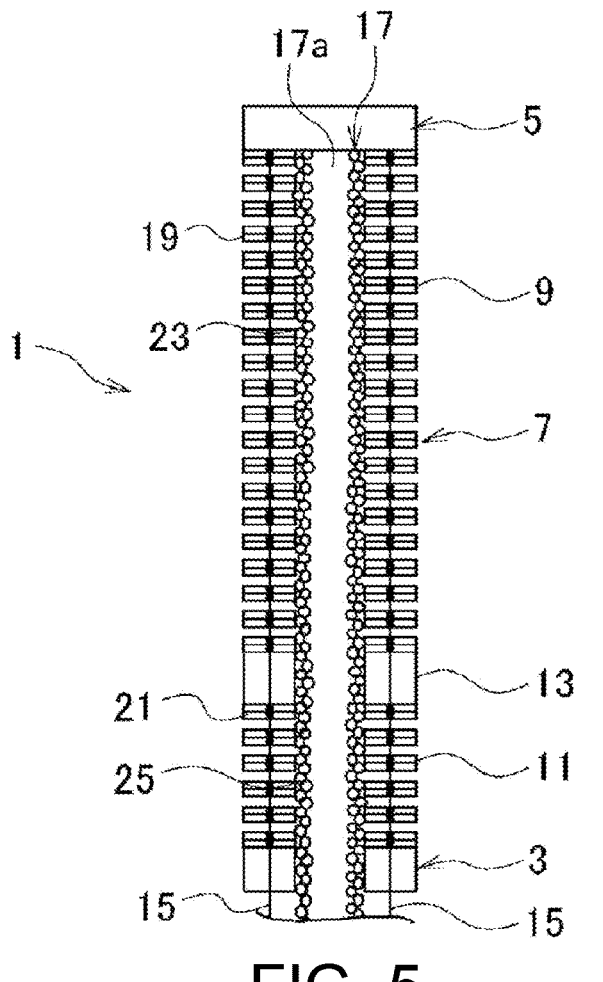
FIG. 5 is a longitudinal cross-sectional view of the bending structure body according to a modified example when the bending structure body is not bent.
Figure 6:
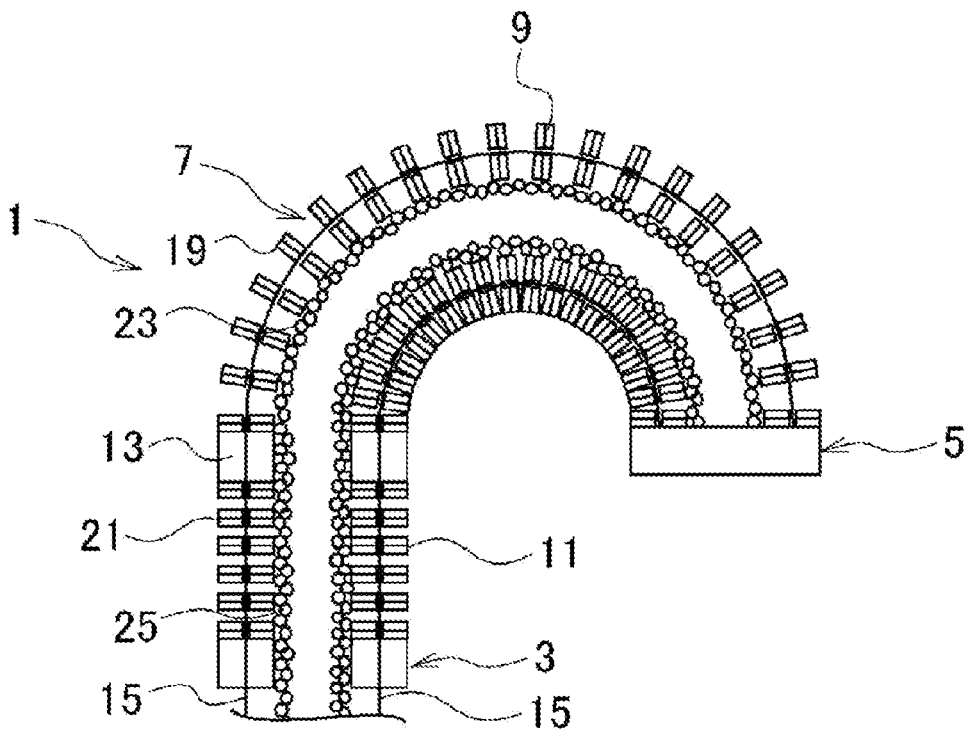
FIG. 6 is a longitudinal cross-sectional view of the bending structure body according to a modified example when the bending structure body is bent.

FIG. 5 and FIG. 6 are longitudinal cross-sectional views of the bending structure body 1 according to a modified example when the bending structure body 1 is not bent and when the bending structure body 1 is bent. FIG. 6 shows a state where only the first bendable part 9 is bent.

In the modified example of FIG. 5 and FIG. 6, the intermediate part 13 is displaced toward the side of the base portion 3 with respect to the central portion of the multi-joint portion 7 in the axial direction to be attached to the flexible member 17. In this modified example, the lengths of the first bendable part 9 and the second bendable part 11 can be changed to change the characteristics. For example, the bending start position of the first bendable part 9, the bending angles of the first bendable part 9 and the second bendable part 11, the bending radius, etc. can be changed.

Besides, contrary to the modified example shown in FIG. 5, the intermediate part 13 may be displaced toward the side of the movable portion 5 to be attached to the flexible member 17. By changing the position for attaching the intermediate part 13 in this way, the characteristics can be easily adjusted.

The intermediate part 13 can also be fitted and attached to be slidable with respect to the flexible member 17. In this case, by adjusting the position of the intermediate part 13, the lengths of the adjacent first bendable part 9 and second bendable part 11 can be changed to change the characteristics. However, it is necessary for the first bendable part 9 and the second bendable part 11 to expand and contract in the axial direction according to the adjustment of the position of the intermediate part 13.

The ends of the outer members 19 and 21 of the first bendable part 9 and the second bendable part 11 are attached to both sides of the intermediate part 13 in the axial direction, respectively. This attachment is performed by fixing such as welding, adhesion, or the like in this embodiment, but the ends of the outer members 19 and 21 may simply be brought into contact with the intermediate part 13 without being fixed.

Thereby, the intermediate part 13 is held by the outer members 19 and 21 from both sides in the axial direction.

The inner and outer diameters of the intermediate part 13 are equal to the inner and outer diameters of the outer members 19 and 21. Therefore, the intermediate part 13 is prevented from protruding in the radial direction with respect to the outer members 19 and 21, so that an external force is prevented from being applied inadvertently.

The inner and outer diameters of the intermediate part 13 may be set larger or smaller than the inner and outer diameters of the outer members 19 and 21. However, the inner diameter of the intermediate part 13 is set within a range in which attachment to the flexible member 17 is possible.

The axial dimension of the intermediate part 13 is set within a range in which bending of the flexible member 17 can be suppressed. Therefore, the bending structure body 1 can minimize the axial dimension of the intermediate part 13 as long as bending of the flexible member 17 can be suppressed. The axial dimension of the intermediate part 13 may be the minimum size that allows the wire for operating the second bendable part 11 to be fixed.

The axial dimension of the intermediate part 13 of this embodiment is smaller than the radial dimension (difference between the inner and outer diameters) of the intermediate part 13. In relation to the flexible member 17, the axial dimension of the intermediate part 13 is about three turns of the outer coil part 29 of the flexible member 17.

However, the axial dimension of the intermediate part 13 can be set appropriately according to the flexibility of the flexible member 17, and may be smaller or larger. In this case, the flexible member 17 may also be configured to adjust the number of winding parts 29*a* attached to the intermediate part 13 according to its flexibility or the like.

Metal, resin, or the like may be appropriately adopted as the material of the intermediate part 13 according to the material of the flexible member 17, the characteristics required for the bending structure body 1, etc.

[Motion]

The bending structure body 1 of this embodiment is capable of bending the first bendable part 9 and the second bendable part 11 in any direction of 360 degrees when the operator pulls any one or a plurality of wires 15 and the wire (not shown).

When the first bendable part 9 bends, the plurality of wave washers 31 of the outer members 19 and 21 are compressed on the inner side of the bending and expanded on the outer side of the bending with respect to the neutral axis.

At the same time, the first portion 23 of the flexible member 17 contracts on the inner side of the bending and expands on the outer side of the bending. In this embodiment, the gap 29*b* of the outer coil part 29 becomes smaller on the inner side of the bending, displacing the inner coil part 27 toward the outer side of the bending; and the gap 29*b* of the outer coil part 29 becomes larger on the outer side of the bending, allowing the displacement of the inner coil part 27.

At this time, the intermediate part 13 suppresses the bending of the flexible member 17 at the attached portion. The intermediate part 13 defines the first portion 23 of the flexible member 17 on the side of the movable portion 5, and the outer member 19 of the first bendable part 9 is attached to the side of the movable portion 5.

Therefore, the intermediate part 13 functions as the base portion of the first bendable part 9. Accordingly, the first bendable part 9 is capable of bending as a whole with respect to the intermediate part 13 to orient the movable portion 5 in a desired direction.

Similarly, when the second bendable part 11 bends, the intermediate part 13 functions as the movable portion of the second bendable part 11, and the second bendable part 11 is capable of bending as a whole with respect to the base portion 3 to orient the intermediate part 13 in a desired direction.

As described above, in the bending structure body 1 of this embodiment, the bending of the first bendable part 9 and the second bendable part 11 allows the movable portion 5 to be oriented in a desired direction.

Effect of Example 1

As described above, the bending structure body 1 of this embodiment includes a plurality of first bendable parts 9 and second bendable parts 11 that are elastically bendable in the axial direction, and the intermediate part 13 positioned between the adjacent first bendable part 9 and second bendable part 11. The first bendable part 9 and the second bendable part 11 include the integral flexible member 17 in the axial direction. The intermediate part 13 is attached to the flexible member 17 between the adjacent first bendable part 9 and second bendable part 11 to suppress bending in the axial direction.

Therefore, the axial dimension of the intermediate part 13 can be reduced as long as bending of the flexible member 17 can be suppressed between the adjacent first bendable part 9 and second bendable part 11. As a result, the bending structure body 1 can achieve a structure which reduces the size of the portion that does not contribute to bending and allows a small-radius turn.

The intermediate part 13 is an annular member for inserting the flexible member 17 in the axial direction, and the inner circumference of the intermediate part 13 is attached to the flexible member 17.

Therefore, by inserting the flexible member 17 through the intermediate part 13 to attach the flexible member 17, the bending of the flexible member 17 can be easily and reliably suppressed with a simple structure.

Since the intermediate part 13 is fixed to the flexible member 17, the bending of the flexible member 17 can be suppressed more reliably. The bending of the flexible member 17 can be suppressed even when the intermediate part 13 is slidably fitted and attached to the flexible member 17.

The first bendable part 9 and the second bendable part 11 respectively include the outer members 19 and 21 that surround the flexible member 17 and have elasticity.

Therefore, in this embodiment, the outer members 19 and 21 can impart elasticity to the first bendable part 9 and the second bendable part 11, and the elasticity of the flexible member 17 can be reduced.

The outer members 19 and 21 of the adjacent first bendable part 9 and second bendable part 11 have ends facing each other across the intermediate part 13 in the axial direction, and the ends are respectively attached to both sides of the intermediate part 13 in the axial direction.

Thus, the intermediate part 13 can serve both as a member for suppressing bending of the flexible member 17 and as a member for supporting the outer members 19 and 21. Therefore, the bending structure body 1 can achieve a structure which reduces the size of the portion that does not contribute to bending and allows a smaller-radius turn.

The flexible member 17 has the inner coil part 27 and the outer coil part 29, and the corresponding winding part 27*a* of the inner coil part 27 is fitted into the gap 29*b* between adjacent winding parts 29*a* of the outer coil part 29.

Therefore, the flexible member 17 is capable of suppressing compression of the first bendable part 9 and the second bendable part 11 in the axial direction, and is capable of making the path length for the member passing therethrough constant. In addition, by adjusting the number of winding parts 29*a* attached to the intermediate part 13, the flexible member 17 can easily adjust the suppression of bending.

What is claimed is:

1. A bending structure body, comprising:
   a plurality of bendable parts that are elastically bendable with respect to an axial direction;
   an intermediate part positioned between adjacent bendable parts; and
   a wire inserted through the plurality of bendable parts and the intermediate part, wherein the plurality of bendable parts comprise a flexible member that is integral in the axial direction, the flexible member comprises an inner coil part and an outer coil part, and corresponding winding parts of the inner coil part are fitted into gaps between adjacent winding parts of the outer coil part, the intermediate part suppresses bending of the flexible member with respect to the axial direction by inserting the flexible member through the intermediate part to attach an inner circumference of the intermediate part to the flexible member between the adjacent bendable parts, and an entire length of the intermediate part in the axial direction is smaller than a difference between an inner diameter of the intermediate part and an outer diameter of the intermediate part in a radial direction.

2. The bending structure body according to claim 1, wherein the intermediate part is an annular member for inserting the flexible member in the axial direction, and has the inner circumference attached to the flexible member.

3. The bending structure body according to claim 2, wherein the intermediate part is fixed to the flexible member.

4. The bending structure body according to claim 2, wherein each of the plurality of bendable parts comprises an outer member that surrounds the flexible member and has elasticity.

5. The bending structure body according to claim 1, wherein the intermediate part is fixed to the flexible member.

6. The bending structure body according to claim 5, wherein each of the plurality of bendable parts comprises an outer member that surrounds the flexible member and has elasticity.

7. The bending structure body according to claim 1, wherein each of the plurality of bendable parts comprises an outer member that surrounds the flexible member and has elasticity.

8. The bending structure body according to claim 7, wherein the outer members of the plurality of bendable parts have ends that face each other across the intermediate part in the axial direction, and the ends are respectively attached to both sides of the intermediate part in the axial direction.

9. The bending structure body according to claim 1, wherein the entire length of the intermediate part in the axial direction spans no more than four turns of the outer coil part of the flexible member.

10. The bending structure body according to claim 1, wherein the entire length of the intermediate part in the axial direction spans no more than three turns of the outer coil part of the flexible member.

* * * * *